Figure 3:
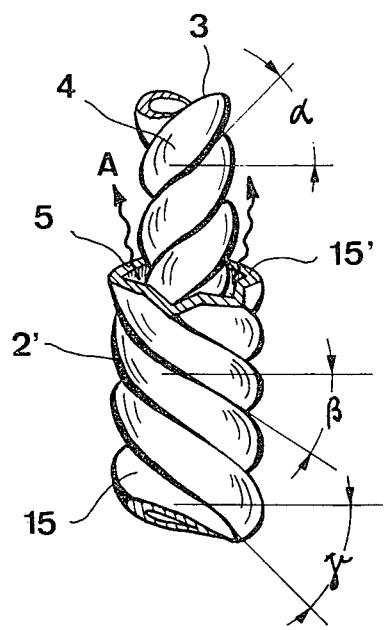

United States Patent [19]

Proske et al.

[11] 4,325,781
[45] Apr. 20, 1982

[54] CO-CURRENT EVAPORATOR

[75] Inventors: Gerhard Proske; Rolf Van der Piepen; Hans-Joachim Bittner, all of Butzbach, Fed. Rep. of Germany

[73] Assignee: Luwa AG, Zürich, Switzerland

[21] Appl. No.: 170,539

[22] Filed: Jul. 21, 1980

[30] Foreign Application Priority Data

Jul. 26, 1979 [CH] Switzerland .................. 6912/79

[51] Int. Cl.³ ............................................. B01D 1/22
[52] U.S. Cl. .................................... 159/13 A; 159/14; 159/28 B; 202/236
[58] Field of Search .............. 159/14, 13 B; 202/28 B, 202/287, 236

[56] References Cited

U.S. PATENT DOCUMENTS

| | | | |
|---|---|---|---|
| 2,732,008 | 1/1956 | Seeley | 159/14 |
| 3,332,468 | 7/1967 | Dietze et al. | 159/13 B |
| 3,846,254 | 11/1974 | Sephton | 159/14 |

*Primary Examiner*—Norman Yudkoff
*Attorney, Agent, or Firm*—Werner W. Kleeman

[57] ABSTRACT

In a vessel (1), several mutually parallel evaporator tubes (2) are arranged which, on their outside, are surrounded by heating steam introduced into the interior (1a) of the vessel. A coaxial displacement body (3) is arranged in the interior of the evaporator tubes (2). A gap (5) is formed between the displacement body (103) and the surrounding evaporator tube (2). The displacement bodies (3) are fixed to a bottom (6) which is demountably joined to the vessel (1). The displacement bodies (3) can be removed by removing the bottom (6). The pre-evaporated product, introduced from below and leaving the evaporator tubes (2) at the top, is passed to a vapor-release vessel (11) in which a separation of vapors and concentrate takes place. Each displacement body (3) is formed by a rifled tube which has been provided by deformation with at least one spirally running recess (4). The product flows through both the gap (5) and this recess (4). A whirling motion which entails an increase in turbulence is thus imparted to the product stream. Since the outside of each displacement body (3) is formed by surfaces with steady mutual transitions, no dead zones favoring deposition are present. The risk of fouling is therefore low so that the evaporator is also suitable for the treatment of salt-containing liquids. The high turbulence which can be achieved also makes this evaporator suitable for the treatment of intrinsically viscous or thixotropic products.

5 Claims, 5 Drawing Figures

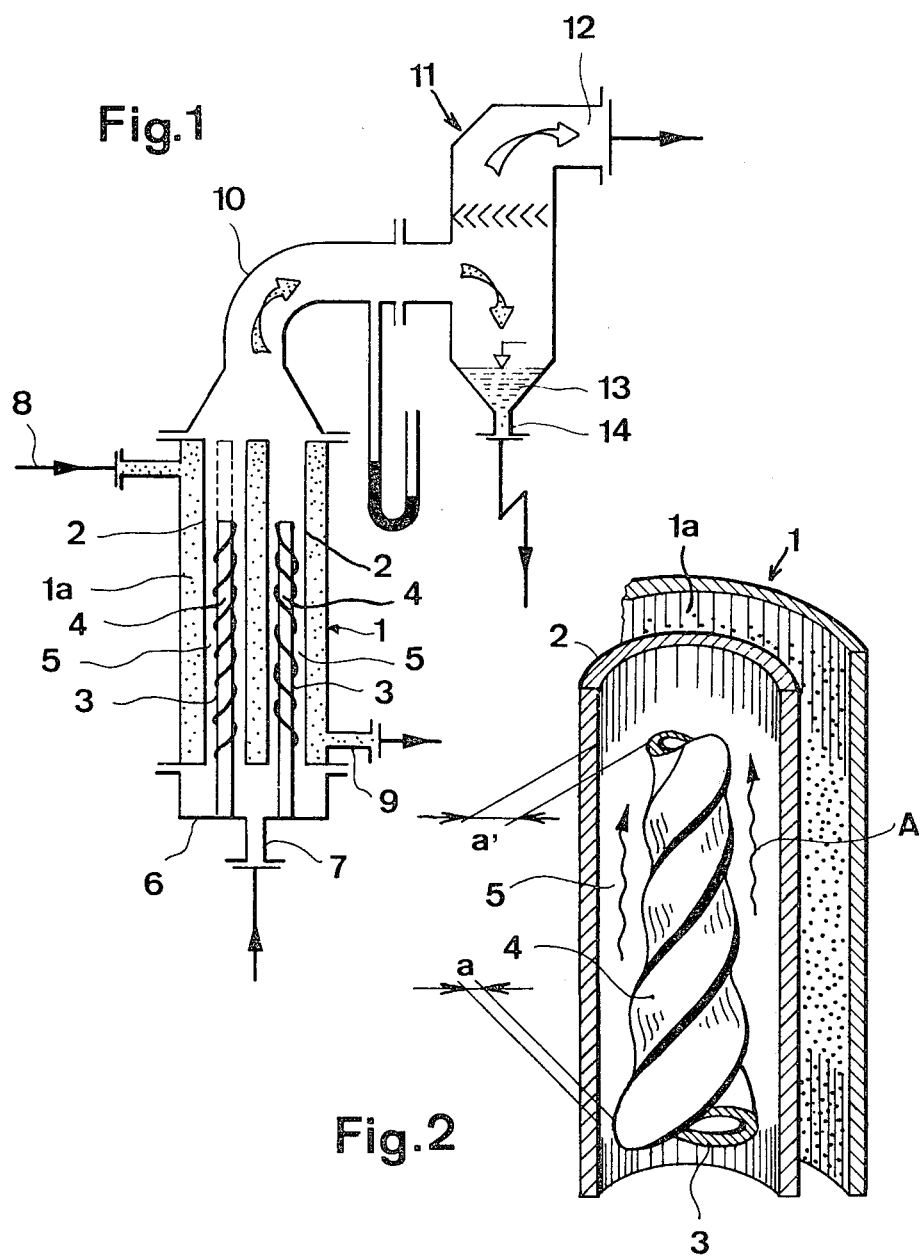

CO-CURRENT EVAPORATOR

The present invention relates to a co-current evaporator and to the use of such evaporators for the treatment of media which tend to form encrustations or for the treatment of intrinsically viscous or thixotropic products. The term "co-current" as used herein refers to the fact that the vapor and treated product flow in the same direction.

Swiss Patent Specification No. 282,725 has disclosed an evaporator in which the displacement body, provided in the interior of the evaporator tube, is formed by a rod to which a helically running, projecting rib is fixed. A helically running flow channel for the product is defined by this rib. The rib is fitted onto the rod, sharp-edged transitions being formed between the rib and rod, in the region of which transitions a dead zone forms in the flow, and this has the consequence that impurities can deposit at these points. The same phenomenon occurs on the edges which are in contact with the inner wall of the evaporator tube. Accordingly, this known evaporator tends to the formation of deposits, scale and encrustations, which necessitate correspondingly frequent cleaning.

It is now the purpose of the present invention to eliminate these disadvantages. It is thus the stated object to provide an evaporator of the type initially set forth, which, coupled with high efficiency, permits gentle treatment of the starting products and which is prone to fouling only to a small extent. According to the invention, this object is achieved by providing the displacement body within the evaporator tube with a helical recess on its exterior and a gap between the exterior of the displacement body and the interior of the evaporator tube.

A rotary motion which effects an increase in turbulence and accordingly an improved heat transfer from the heated evaporator tube to the product which is to be treated, is thus imparted to the product stream which flows through the helical recess, of which there is at least one. Due to the high flow velocity of the product, there is a high shear gradient which makes it possible to treat intrinsically viscous or thixotropic products. Since the recess in the displacement body is preferably formed by deformation of a tube, the displacement body does not have any sharp edges, favoring deposition, on its outside. Rather, the transition between the surfaces defining the outline of the displacement body is steady, so that no rheologically dead zones are formed. The outside of the displacement body is thus virtually completely enveloped by the flow of the medium flowing both in the recess and in the gap between the evaporator tube and the displacement body and, because of the high flow velocity, this means that deposits are entirely or at least very largely avoided.

In the evaporator according to the present invention, a flow channel in the form of an annular gap is formed by the smooth-walled displacement body, and this entails an increase in the flow velocity. In this way, the formation of deposits is avoided and the shear gradient is increased so that such an evaporator is also suitable for the treatment of intrinsically viscous or thixotropic products.

Figure 4:
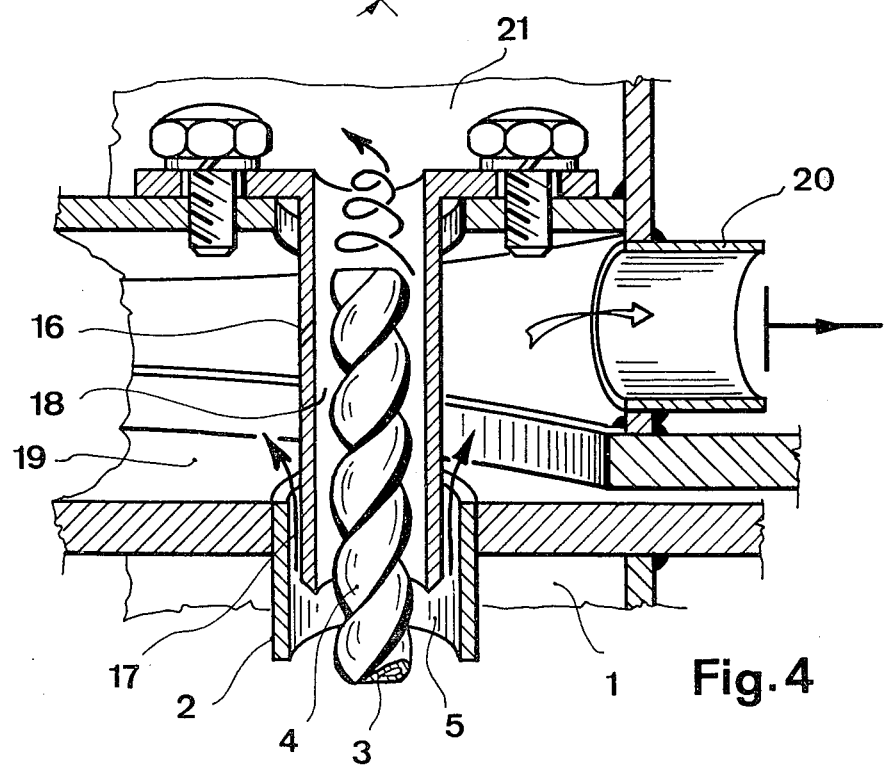
Figure 5:
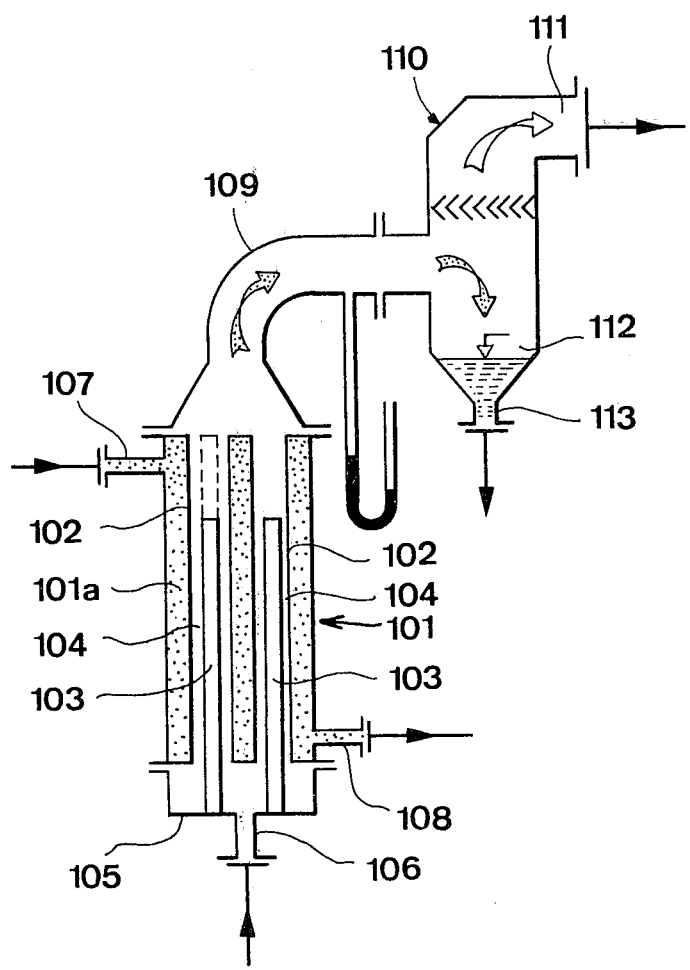

In the following text, illustrative embodiments of the subject of the invention are explained in more detail by reference to the drawing in which:

FIG. 1 diagrammatically shows a co-current evaporator having spirally deformed displacement bodies, FIG. 2 perspectively shows a part of an evaporator tube with a displacement body, FIG. 3 shows another embodiment of an evaporator tube in side view, FIG. 4 shows the upper end of an evaporator tube with a separating tube in a diagrammatic and perspective view, and FIG. 5 diagrammatically shows a co-current evaporator having smooth-walled displacement bodies.

The co-current evaporator shown in FIG. 1 comprises a cylindrical vessel 1, in the interior of which several vertically extending evaporator tubes 2 are arranged and are held in their position in a manner which is not shown in more detail. In the interior of each evaporator tube, a displacement body 3 is arranged which is preferably coaxial to the associated evaporator tube 2. These displacement bodies may extend over only a part or over the entire length of the evaporator tube 2, as is shown or indicated by dashes, respectively, in FIG. 1. Each displacement body 3 consists of a spirally deformed tube which, on its outside, has a helically running recess 4 produced by this deformation. It is, of course, also possible to provide two and more helical recesses 4 of this type. The recess or recesses can be left-handed or right-handed, the pitch being constant or varying over the length of the displacement body 3. This pitch is preferably 20°–80°.

A gap 5 of constant or varying width is formed between the displacement body 3 and the inner wall of the associated evaporator tube 2. At the lower end, the vessel 1 is closed off by a bottom 6 which carries an inlet branch 7 for the product to be treated. The product fed in through this inlet branch 7 flows upwards between the displacement bodies 3 and the evaporator tubes 2 surrounding the latter, in a manner which will be described below. In addition, the vessel 1 is provided with a steam inlet branch 8 and a condensation outlet branch 9. The steam entering the interior 1a of the vessel 1 through the inlet branch 8 of the latter flows around the outside of the evaporator tube 2 and, in a known manner, serves for heating these evaporator tubes.

A connecting branch 10, which is joined to a vapor-release vessel 11 of a design known per se, is fixed to the top of the vessel 1. This vapor-release vessel 11 is provided at the top with a vapor outlet 12 and, at the bottom, with a concentrate receiver 13 to which a take-off branch 14 is connected.

The displacement bodies 3 are fixed to the bottom 6 at their lower ends. This bottom is detachably joined to the vessel 1 so that the displacement bodies 3 can readily be moved out of the evaporator tubes 2 by removing the bottom 6, and this facilitates cleaning of both the evaporator tubes 2 and the displacement bodies 3, if this should become necessary. It is also possible to design the common bottom of the displacement bodies 3 to be movable in the longitudinal direction of these displacement bodies 3, and this enables the displacement bodies 3 to be longitudinally moved in the interior of the evaporator tubes 2 and hence enables the flow rate to be controlled.

As can be seen from FIG. 2 which shows a part of an evaporator tube 2, the width of the gap 5 can vary over the length of the evaporator tube 2. As shown, the gap width increases in the direction A of flow, as indicated by the gap width a and the greater gap width a'. The cross-section of the flow channel thus increases in the direction A of flow. This increase in the flow cross-section can be achieved, as already mentioned, by an enlargement of the gap 5 or, alternatively, by an increase in the cross-section of the recess 4. In the solution shown in FIG. 2, this increase in the gap width is obtained by a corresponding reduction of the diameter of the displacement body 3. In order to obtain a widening gap 5, it is likewise conceivable to increase the diameter of the evaporator tube 2 in the direction A of flow, the diameter of the displacement body 3 remaining constant. Preferably, the increase in cross-section of the flow channel is 20–60% relative to the smallest cross-section. Together with the facility, which has been mentioned, for longitudinally moving the displacement bodies 3, such a variation of the flow cross-section enables the flow rate to be regulated in an optimum manner, corresponding to the properties of the product to be treated and to the other process conditions.

As already mentioned, the width of the gap 5 can be kept constant over the length of the evaporator tube, in which case the cross-sectional area of the gap 5 is between 20 and 60% of the internal cross-sectional area of the evaporator tube 2.

The product to be treated, which is fed in through the inlet branch 7, flows upwards through the recess 4 and the gap 5. In the heated evaporator tubes 2, evaporation takes place in the same way as in film evaporators. A rotary motion is imparted to the product stream flowing through the helical recesses 4, whereby the higher density fractions are thrown outwards against the inner wall of the evaporator tube. A product film forms on this inner wall. High turbulence is generated by the whirling motion imparted to the product stream, whereby heat transfer is enhanced. The pre-evaporated product, leaving the top of the vessel 1, passes via the connecting branch 10 into the vapor-release vessel 11 in which a separation of the vapors from the concentrate takes place. The concentrate obtained is collected in the receiver space 13 and can be discharged via the take-off branch 14.

Instead of using smooth-walled tubes as the evaporator tubes 2, as shown in FIGS. 1 and 2, it is also possible to form these evaporator tubes likewise from spirally deformed tubes 2', as shown in FIG. 3. The evaporator tubes 2', which thus constructionally correspond to the displacement bodies 3 and have a larger diameter than these, are now likewise provided with one or more helically running recesses 15. These recesses 15 and the recesses 4 can here be wound in the same direction or in opposite directions. In the same way as in the case of the displacement bodies 3, the pitch of the recess 15 can remain constant or can vary over the length of the evaporator tube 2', as represented in FIG. 3 by the two different pitch angles $\beta$ and $\gamma$. The pitch of the recess 15 is preferably 20°–80°. It is possible to choose the pitch $\alpha$ of the recess 4 of the displacement body 3 to be equal to or different from the pitch $\beta$ or $\gamma$ of the recess 15 of the evaporator tube 2'.

If the evaporator tubes 2' are likewise produced from spirally deformed tubes, as shown in FIG. 3, turbulence is yet further increased in the product stream flowing through the gap 5, the recess 4 and the recess 15' located on the inside of the evaporator tube 2'. The enlargement of the external surface area of the evaporator tubes 2', resulting from the spiral deformation of the evaporator tubes 2, has the effect of improving heat transfer from the heating steam, flowing around these evaporator tubes 2', to the evaporator tubes.

As already mentioned, the rotary motion imparted to the product stream has the consequence that the higher density particles are thrown outwards against the inner wall of the evaporator tube 2, whilst the lower density particles are located next to the displacement body 3. This phenomenon can now be utilized for separating the higher density phase from the lower density phase. For example, this can be effected by means of a separating tube 16, as diagrammatically shown in FIG. 4. This separating tube 16 engages at the upper end of the evaporator tube 2 in the gap 5 between the evaporator tube 2 and the displacement body 3. Between the evaporator tube 2 and the separating tube 16, there is an annular gap 17, whilst a gap 18 is formed between the displacement body 3 and the separating tube 16. The outer gap 17 leads into a closed receiver space 19, to which an outlet branch 20 is connected. The gap 18, that is to say the interior of the separating tube 16, communicates with a further receiver space 21 which is only shown diagrammatically. The higher density phase leaving through the gap 17 can now be collected in the receiver space 19 and can be led away via the outlet branch 20 for further treatment, whilst the lower density phase passes through the interior of the separating tube 16 into the receiver space 21, from where it can be led away, in a manner which is not shown, for further treatment.

With otherwise identical dimensions of the evaporator tubes 2, 2' and of the displacement bodies 3, it is possible to increase the heating area for heating the product to be treated by heating the evaporator tubes 2 from the inside. Instead of selecting upward flow of the product stream in vertical evaporator tubes 2, 2', as shown in the figures, the product flow can also be directed downwards, which obviously entails a correspondingly different design of the evaporator. Of course, the evaporator tubes 2, 2' can also be horizontally arranged instead of vertically, and additionally it is also possible to give the evaporator tubes 2, 2' any desired direction between the vertical and the horizontal.

Additionally, the evaporator can also be provided with a feed line for a drying medium, preferably an inert gas, which feed line is not shown in the figures and leads to the inlet side of the evaporator tubes 2, 2'. This drying medium then serves the purpose of drying the substances, which are to be treated, present in the liquid phase.

As already mentioned, the rotary motion imparted to the product stream effects an increase in turbulence and this entails the presence of a high shear gradient. This in turn also permits a treatment of intrinsically viscous or thixotropic products which can be treated only with great difficulty, or not at all, in conventional static apparatuses, because of the low shear gradient present in that case. In particular, using the evaporator described, substances can be treated which, under process conditions, have a viscosity of up to 10 Pa.s.

Since the recess 4 in the displacement body 3 and/or the recess 15, 15' in the evaporator tube 2' are produced by deformation of a tube, the external outline of the displacement bodies 3 and the internal outline of the evaporator tubes 2' are formed by surfaces which have a steady curvature and which also have steady mutual transitions. Thus, dead zones in which materials can deposit, cannot be formed. The product stream, flowing at high velocity, thus flows completely around the inner wall of the evaporator tubes 2, 2' and the outside of the displacement bodies 3, thereby any particles which may tend to deposition are entrained again. In the evaporator described, the risk of fouling is substantially smaller than in the known evaporators without mechanically driven wiper blade rotors.

For this reason, this evaporator is suitable for the treatment of products, which form encrustations, and above all for the treatment of salt-containing liquids, preferably of effluents. As the following example shows, a concentration, which is unattainable with conventional static evaporators in continuous operation, can be achieved in the treatment of a salt-containing liquid in an evaporator according to the invention. A salt-containing liquid, having an initial concentration of 23% by weight of NaCl, was introduced, at an inlet temperature of 144° C., into the bottom of an evaporator having vertical smooth-walled evaporator tubes. On their outside, the evaporator tubes were heated by means of a heating medium which had an inlet temperature of 200° C. The displacement bodies, arranged in the interior of the evaporator tubes, were formed from spirally deformed tubes having a helically running recess. This recess had a pitch of 30°. The cross-section of the gap between the displacement body and the evaporator tube, surrounding the former, was 54% of the internal cross-sectional area of the evaporator tube. The product flowed upwards through the evaporator tubes under normal pressure and with a throughput rate of 145 kg/m$^2$ per hour. The end concentration of the discharged product was 57% by weight of NaCl.

As already mentioned, such a high end concentration is impossible in conventional static evaporators and can only be achieved in thin-layer evaporators with mechanical movement.

Compared with the known static tubular evaporators, the evaporator according to the invention also has the following surprising advantage:

In all known static tubular evaporators, an increase in the end concentration, under otherwise constant operating conditions, is achieved only by reducing the feed rate. Particularly in the case of a low liquid load, this has the disadvantage that dewetting and hence damage to the product can occur.

By contrast, in the evaporator according to the invention, an increase in the end concentration is found with rising feed rate, within certain limits and under otherwise identical operating conditions. The said disadvantages of the conventional evaporators are thus absent.

The abovementioned effect can be achieved during the treatment of the most diverse products in the evaporator according to the invention by appropriate design of the evaporator tubes and of the displacement bodies.

The evaporator shown in FIG. 5 comprises a cylindrical vessel 101, in the interior of which vertical, smooth-walled evaporator tubes 102 are arranged. These evaporator tubes are held in their position in a manner which is not shown in more detail. In the interior of these evaporator tubes 102, there are preferably coaxial displacement bodies 103 which are formed from smooth-walled tubes. These displacement bodies 103 extend only over a part of the length of the evaporator tubes 102, but they can, as shown in dashes, extend over the entire length of the evaporator tubes. Between each displacement body 103 and the evaporator tube 102 surrounding the former, a gap 104 is formed, the width of which is constant or varies over the length of the displacement body 103. In order to obtain an increase in the flow cross-section in the direction of the upward flow, this gap 104 is formed in such a way that it widens in the direction of flow. This can be accomplished either by reducing the diameter of the displacement body 103, or by increasing the diameter of the evaporator tube 102, in the direction of flow. The lower end of the vessel 101 is closed off by a bottom 105 to which the displacement bodies 103 are fixed. An inlet branch 106 for the product to be treated is provided in the bottom 105. The vessel 101 is provided with a steam inlet branch 107 and a condensate outlet branch 108. The heating steam, entering through the steam inlet branch 107, flows around the outside of the evaporator tubes 102 and, in the known manner, effects heating of the product flowing in the interior of the evaporator tubes 102. At its top, the vessel 1 ends in a connecting branch 109 which leads to a vapor-release vessel 110 of known design. This vapor-release vessel 110 has a vapor outlet 111 and a receiver space 112 for the concentrate obtained. This receiver space 112 is connected to a take-off branch 113.

The bottom 105 carrying the displacement bodies 103 can readily be detached from the vessel 101 so that the displacement bodies 103 can be demounted without difficulty in order to enable the evaporator tubes 102 and the displacement bodies 103 to be cleaned. It is also conceivable that the bottom, which is common to all the displacement bodies 103, is of movable design so that it is possible to move the displacement bodies 103 in their longitudinal direction. In the case of a varying width of the gap 104, the flow rate can be regulated by moving the displacement bodies 103.

The product fed in via the inlet branch 106 flows through the gap 104 between the displacement body 103 and the evaporator tube 102. In the heated evaporator tube 102, evaporation takes place in the same way as in film evaporators. A product film thus forms on the inner wall of the evaporator tube 102. The pre-evaporated product leaving the evaporator tubes 102 passes via the connecting branch 109 into the vapor-release vessel 110 in which the vapors are separated from the concentrate which is collected in the receiver space 112 and discharged via the take-off branch 113. The product flowing at high velocity through the gap 104 prevents the formation of deposits on the inner wall of the evaporator tubes 102 or on the outer wall of the displacement bodies 103.

In order to obtain now an increase in the heating area, with otherwise identical dimensions of evaporator tubes 102 and displacement bodies 103, the displacement bodies 103 can be heated from the inside.

The product flow can also be directed downwards, instead of upwards as shown, and the construction of the evaporator must be correspondingly adapted in this case. The evaporator tubes 102 can also have a direction which differs from the vertical.

The evaporator tubes 102 can also be formed by rifled tubes instead of smooth-walled tubes. Such rifled tubes can be manufactured by spiral deformation of tubes, in which one or more helically running recesses are produced by this deformation. The pitch of these recesses can be constant or can vary over the length of the evaporator tubes 102, as already explained by reference to FIG. 3. A whirling motion, which entails an increase in turbulence, is imparted to the product stream flowing through the gap 104 by the shape of the wall of an evaporator tube 102, which has been spirally deformed in this way. This achieves better heat transfer and increases the shear gradient. Like the evaporator according to FIGS. 1–4, the evaporator shown in FIG. 5 is thus also suitable for the treatment of intrinsically viscous or thixotropic products.

Since deposits likewise cannot form in the evaporator according to FIG. 5, this evaporator is, furthermore, suitable for the treatment of products which form encrustations, above all salt-containing liquids, in particular effluents.

We claim:

1. A co-current evaporator having a plurality of evaporator tubes adapted to be heated on the exterior thereof, each evaporator tube having a displacement body disposed interiorly thereof and cooperating therewith to define a flow channel, each displacement body having a smooth wall which forms a gap with the surrounding evaporator tube, said gap having a width which is constant or variable over the length of the evaporator tube, said displacement bodies having a hollow interior and means for supplying heat to the hollow interior of the displacement bodies.

2. An evaporator as claimed in claim 1, wherein the displacement bodies extend over only a part of the length of the associated evaporator tube.

3. An evaporator as claimed in claim 1, wherein the displacement bodies are demountable.

4. An evaporator as claimed in claim 1, wherein the displacement bodies are fixed at one of their ends to a common support.

5. An evaporator as claimed in claim 1 for the treatment of media which tend to form encrustations, particularly salt-containing effluents or for the treatment of intrinsically viscous or thixotripic products.

* * * * *